Figure 1:
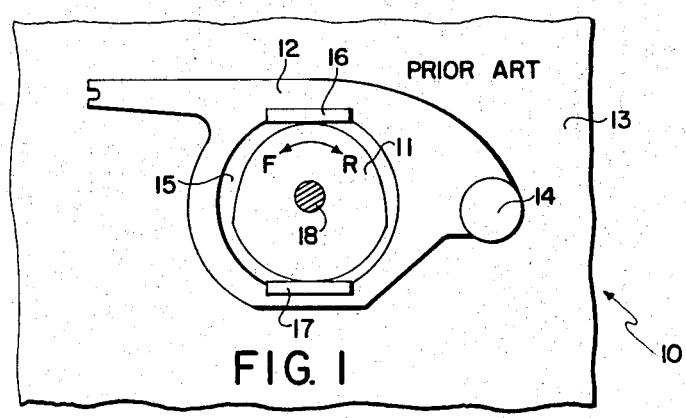

United States Patent

[11] 3,630,423

| [72] | Inventor | Rogers B. Downey<br>Lexington, Mass. |
| --- | --- | --- |
| [21] | Appl. No. | 888,228 |
| [22] | Filed | Dec. 29, 1969 |
| [45] | Patented | Dec. 28, 1971 |
| [73] | Assignee | Polaroid Corporation<br>Cambridge, Mass. |

[54] MOTION PICTURE FILM TRANSPORT MECHANISM
21 Claims, 5 Drawing Figs.

| [52] | U.S. Cl. | 226/51, 226/65 |
| --- | --- | --- |
| [51] | Int. Cl. | G03b 1/22 |
| [50] | Field of Search | 226/51, 50, 49, 64, 65, 66; 352/173 |

[56] References Cited
UNITED STATES PATENTS

| 3,447,868 | 6/1969 | Krumbein | 352/173 |
| 3,516,588 | 6/1970 | O'Donnell | 226/51 X |

*Primary Examiner*—Allen N. Knowles
*Attorneys*—Brown and Mikulka, William D. Roberson and Michael Bard ABSTRACT: A reversible intermittent advance mechanism of the cam-claw variety is provided for use in cinematograph projection apparatus. Means are provided for assuring that the claw is positively driven by the cam in both the forward and reverse projection modes.

Basically, the invention comprises a disc cam having a periphery of varying radius of curvature, with respect to its axis of rotation, and of constant diameter. A claw is provided having an interior opening and having a pair of contact shoes diametrally positioned about the periphery of said opening.

The cam is positioned between said contact shoes and in engagement with only one of said shoes for any direction of rotation of said cam. Spring means are provided for maintaining contact between either of said contact shoes and said cam; said spring means being adapted to bias a preselected one of said contact shoes into engagement with said cam depending upon the direction of rotation of said cam.

Reversal of the direction of advance is accomplished by adjusting the spring means so as to bring the other of said pair of contact shoes into engagement with said cam and by also reversing the direction of rotation of said cam.

Patented Dec. 28, 1971

3,630,423

2 Sheets-Sheet 1

INVENTOR.
ROGERS B. DOWNEY

BY

Brown and Mikulka
and
Michael Bard
ATTORNEYS

INVENTOR.
ROGERS B. DOWNEY
BY
Brown and Mikulka
and
Michael Bard
ATTORNEYS 3,630,423

MOTION PICTURE FILM TRANSPORT MECHANISM

BACKGROUND OF THE INVENTION

The present invention relates, generally, to intermittent advance mechanisms for use in a cinematograph and, more particularly, to an improved cam-claw mechanism for reversibly transporting a film through cinematograph projection apparatus.

It is well known that various types of cinematographic apparatus employ intermittent film advancing mechanisms. The two better known types of these mechanisms are the Geneva intermittent mechanism, using a pinwheel-star wheel combination, and the cam-claw type. Prior art mechanisms of the cam-claw variety include those mechanisms employing positive drive; i.e., where the claw is driven directly by the cam and spring drive, i.e., where the driving force is supplied to the claw by a spring. Generally, positive drive is more reliable than the spring type of drive, and is therefore to be preferred.

Typical of the prior art intermittent advance mechanisms, is a reversible intermittent advance mechanism employing a constant diameter disc cam. This mechanism includes a claw having an interior opening therein of sufficient size to receive the cam and having two diametrally positioned contact faces which bear against opposite portions of the periphery of the cam. The cam itself is precision made to assure a very close fit between the contact surfaces of the claw, but, nevertheless, some clearance must be provided.

The cam is rotatable about a fixed axis and the claw is pivotally secured to the housing of a projector or the like. The cam itself has a predetermined and variable radius, with respect to its axis of rotation, such that rotation of the cam will positively drive the claw and effect pivotal movement thereof. Reversing the advance mechanism is simply a matter of reversing the direction of rotation of the cam.

In operation, the small clearance between the cam and the contact surfaces of the claw will permit the claw to bounce, such that its opposite contact surfaces will alternately contact the periphery of the cam with attendant undesirable clatter. This bounce and attendant clatter will occur irrespective of the direction of rotation of the cam.

SUMMARY OF THE INVENTION

The instant invention provides an improved reversible cam-claw mechanism for intermittently advancing film in cinematographic apparatus. The invention accomplishes its purpose by employing a claw which is pivotally secured to the housing of a cinematograph; e.g., a projector and provided with an opening therein having a pair of contact shoes diametrally secured to its periphery. A disc cam is positioned within said opening between said contact shoes and is rotatable about an axis generally parallel to the pivotal axis of the claw. The disc cam is of a constant diameter (which is substantially less than the perpendicular distance between the contact shoes) and the radius of curvature of the cam surface is varied to impart a predetermined motion to the claw.

In practice, the claw is biased, by means of a spring, to maintain engagement between one of its contact shoes and the cam periphery, depending upon the direction of rotation of the cam. To effect reversal of motion of the advance mechanism, the spring bias is adjusted to bring the other contact shoe in contact with the cam surface and the direction of rotation of the cam is reversed.

By virtue of the substantial difference between the diameter of the cam and the perpendicular distance between the contact shoes, a wider tolerance in that dimension is permissible and the need for a precision cam is obviated. Also, the spring bias tends to eliminate bounce of the claw with its attendant and unwanted clatter.

Accordingly, it is an object of the present invention to provide an improved cam-claw intermittent advance mechanism for use in a cinematograph wherein the claw is positively driven by the cam.

Another object of the instant invention if to provide an improved cam-claw intermittent advance mechanism employing a nonprecision cam and capable of both forward and reverse operation without attendant clatter.

Still another object of this invention resides in the provision of a cam-claw intermittent advance mechanism capable of forward and reverse operation and wherein the claw is reversibly biased into contact with the cam by spring means.

Yet another object of this invention is to compensate for the change in the position of a film strip, or the like (during the forward and reverse movement of the film in a cinematograph), due to the difference in size between the perforations in the film strip and the portion of the conveying claw which enters such perforations.

A further object of the subject invention resides in the provision of a quiet and inexpensive cam-claw intermittent advance mechanism employing means to effectively bias opposite contact surfaces of the claw into contact with the cam, so as to permit the cam to positively drive the claw irrespective of the direction of advance.

Figure 2:
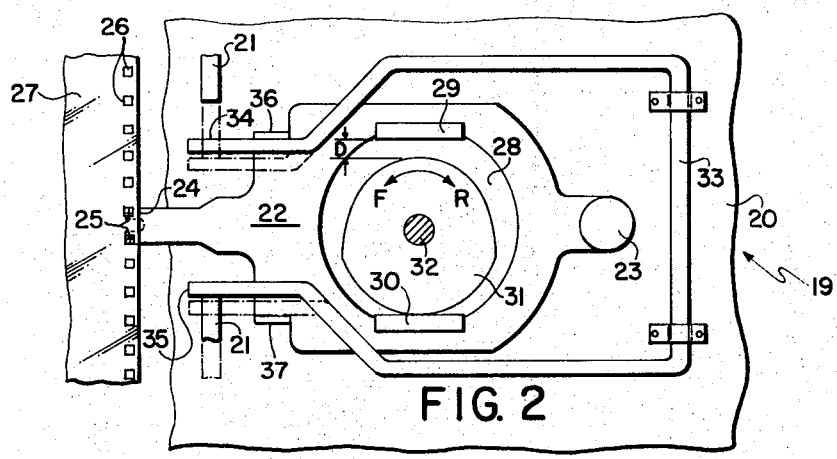
Figure 3:
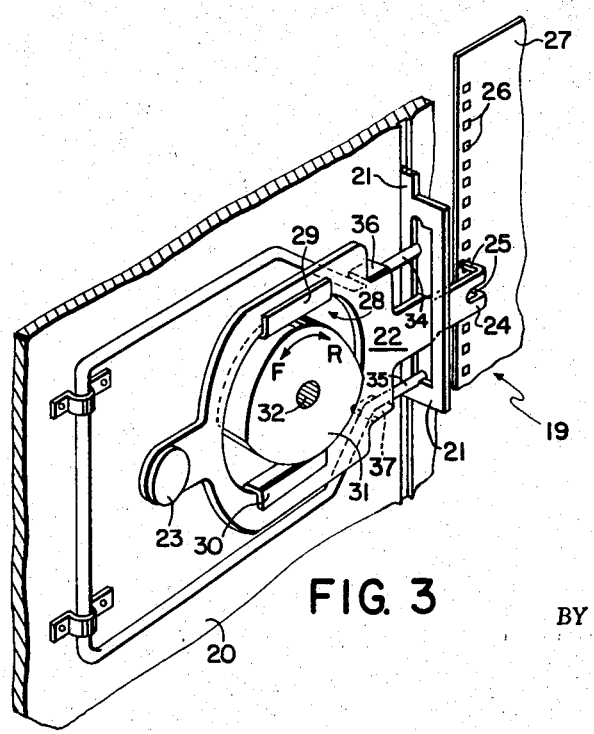
Figure 4:
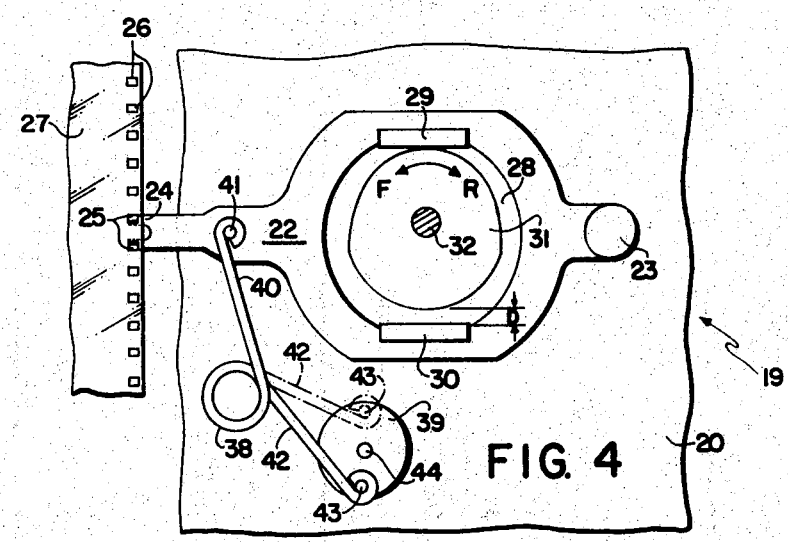
Figure 5:
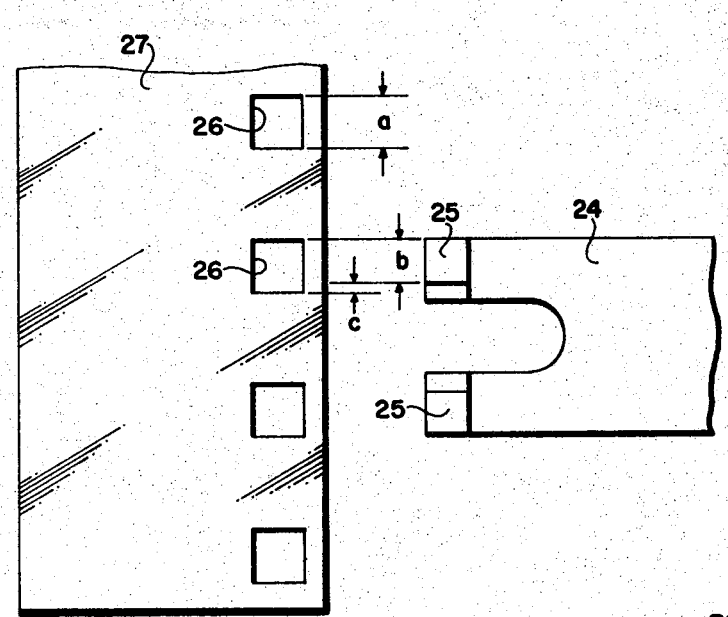

Other objects and many of the attendant advantages of the present invention will be better appreciated and said invention will become clearly understood by reference to the following detailed description when considered in conjunction with the accompanying drawings illustrating two embodiments of the instant invention, wherein:

FIG. 1 is a partial side elevation of a typical prior art cam-claw intermittent advance mechanism;

FIG. 2 provides a diagrammatic side elevation of one embodiment of the instant invention;

FIG. 3 is a simplified perspective of the embodiment of the invention illustrated in FIG. 2;

FIG. 4 provides a diagrammatic side elevation of another embodiment of the instant invention; and FIG. 5 provides a diagrammatic representation of the geometry of the end portion of the claw of FIGS. 2, 3 and 4 with respect to that of the perforations in a film strip.

Referring to the drawings in more detail, and more particularly to FIG. 1, a prior art reversible intermittent advance mechanism of the cam-claw variety is shown generally at 10, including a disc cam 11 and a claw plate 12. The claw plate 12 is rockably secured to the housing 13 of a cinematograph by means of a pivot 14. The claw plate 12 includes an opening 15 centrally therethrough having a pair of spaced parallel contact shoes 16 and 17 diametrally secured to the periphery thereof.

The disc cam 11 is disposed within the opening 15 between the contact shoes 16 and 17, and rotatably secured to a shaft 18 for forward and reverse movement as shown by the arrows and the symbols F and R, respectively. The disc cam 11 is precision made to fit snugly between the contact shoes 16 and 17 with only a very small clearance therebetween.

For both forward and reverse operation of the cam 11, the driving force for providing clockwise movement of the claw plate 12, about the pivot 14, is transmitted by the cam 11 through the contact shoe 16. In a like manner, the driving force for providing counterclockwise movement of the claw plate 12, about the pivot 14, is transmitted by the disc cam 11 through the contact shoe 17.

Thus, the driving force transmitted by the cam 11 to the claw plate 12 will be transmitted in alternation through the contact shoes 16 and 17, respectively, notwithstanding the direction of rotation of the cam 11. This alternation, of the point of application of the driving force, will effect bounce of the claw plate 12 and attendant clatter due to the small clearance present between the cam 11 and the claw plate 12.

Referring again to FIGS. 2 and 3, the present invention is shown generally at 19 including a projector housing 20 or the like, having an apertured plate 21 (shown diagrammatically in FIG. 2) slidably affixed thereto so as to be movable between upper and lower positions. A claw plate 22 is rockably secured to the housing 20 by a pivot 23 and extends through the apertured plate 21 to a generally L-shape bifurcated portion 24. The bifurcated portion 24 includes a pair of tines 25 adapted to be received within a series of aligned perforations 26 such as is common in a motion picture film 27, or the like.

The claw plate 22 includes a generally circular opening 28 therethrough, and a pair of contact shoes 29 and 30 are diametrally secured to the inner periphery thereof in spaced parallel relationship. A disc cam 31 is disposed within the opening 28 between the contact shoes 29 and 30 and is rotatably secured to a shaft 32 for forward and reverse rotation as indicated by the arrows and the symbols F and R, respectively.

The shaft 32 is secured at one end to the housing 20 and extends normally therefrom so as to be parallel with the pivot 23. Thus, the claw plate 22 is rockably secured to the pivot 23 such that its plane of movement is generally coincident with the plane of rotation of the disc cam 31.

The cam 31 is essentially the same as the cam 11, mentioned hereinabove, in that it is of constant diameter but of varying radius. The cam 31, however, does not have to be manufactured with the precision of the cam 11 and the diameter of the cam 31 is such that the perpendicular distance between the contact shoes 29 and 30 exceeds same by an amount D about which more will appear infra.

A generally U-shaped spring 33, having substantially parallel leg portions 34 and 35, is secured to the housing 20 with said leg portions 34 and 35 extending through said apertured plate 21 and in juxtaposition with the claw plate 22.

The claw plate 22 is provided with tabs 36 and 37 adapted to receive the spring legs 34 and 35, respectively. The spring 33 is preloaded such that the spring legs 34 and 35 will engage the tabs 36 and 37, respectively when the claw plate 22 is in a neutral, or horizontal, position.

When it is desired to impart a downward movement to the film 27 (in the plane of the drawings) the apertured plate 21 is slidably moved to its upper position and secured thereat in a well-known manner, effectively disengaging the spring leg 35 from the tab 37. The spring leg 34 will remain in engagement with the tab 36 (by virtue of the spring preload) and cause the claw plate 22 to move about the pivot 23 in a clockwise direction so as to effect engagement between the contact shoe 30 and the periphery of the cam 31.

Rotation of the disc cam 31 in the direction indicated by the symbol R will cause the claw plate 22 to move about the pivot 23 in a counterclockwise manner, whereby the tines 25 will bear against the lower edges of the perforations 26 conveying the film 27 in a downward direction. At the end of the downward cycle, the tines 25 may be disengaged from the perforations 26 by pivoting the claw plate outwardly from the film 27 in a plane normal thereto.

Such disengagement may be effected in a well-known manner, and in slaved relation to the rotation of the cam 31, by means of a face cam (not shown) rotatably, secured to the shaft 32 and affixed to the cam 31. Such a mechanism is well known in the art, and will not be further described herein.

When it is desired to reverse the direction of travel of the film 27 the apertured plate 21 may be slidably moved to its lowermost position (FIG. 2) and secured thereat in a well-known manner. The spring leg 34 will be disengaged from the tab 36 and the spring leg 35 will again be permitted to engage the tab 37 so as to move the claw plate 22 about the pivot 23 in a counterclockwise direction and effect contact between the shoe 29 and the periphery of the cam 31.

Rotation of the cam 31, in the direction indicated by the symbol F thereon, will cause the claw plate 22 to move about the pivot 23 in s clockwise direction, whereby the tines 25 will engage the upper surfaces of the perforations 26 and effect the upward movement (in the plane of the drawing) of the film 27.

Referring again to FIG. 5, the L-shaped bifurcated end portion 24, of the claw plate 22, is shown removed from the film 27. If we designate the width of the perforations 26 by $a$ and the width of the tines 25 by $b$, it is readily apparent that the width of each of the perforations 26 exceeds the width of each of the tines 25 by an amount $c$. Thus, it is evident that the tines 25 will have to move the distance $c$ before any reversal will take place in the direction of travel of the film 27.

Accordingly, in order to prevent any misregistration of the film 27, for example, with the picture window of a projector, when the direction of travel of the film 27 is reversed, the clearance D between the cam 31 and the contact shoes 29 and 30 is made such that movement of the claw plate 22 about the pivot 23 (so as to alternate the contact shoe, 29 or 30, engaging the cam 31) will cause the tines 25 to move vertically, the distance $c$, within their respective perforations 26.

It should be emphasized at this point that only one of the contact shoes 29 or 30 is in engagement with the periphery of the cam 31 for any given direction of travel of the film 27. Also, the claw plate 22 is positively driven by the cam 31 away from its neutral or horizontal position, but is returned to such neutral position by means of the spring leg 34 or 35 which was previously displaced from its neutral position (by its respective tab 36 or 37) during the displacement of the claw plate 22 from the neutral position.

Referring again to FIG. 4, an alternate embodiment for the invention of FIG. 2 is shown, wherein corresponding parts are identified with the same numerals used in FIGS. 2, 3 and 5. In the embodiment of FIG. 4, the claw plate 22 is shown with the contact shoe 29 in engagement with the cam 31, for movement of the film 27 in an upward direction. The embodiment of FIG. 4 differs from that of FIG. 2 in that the spring 33 and apertured plate 21 are replaced with a torsion spring 38 and a direction-selection wheel 39. Also, the tabs 36 and 37 have been eliminated, as they are not necessary in this embodiment.

Briefly, one leg 40 of the torsion spring 38 is secured to the claw plate 22, at 41 in a well-known manner. The other leg 42 of the spring 38 is oppositely directed from the leg 40 and is eccentrically secured to the direction-selection wheel 39, at 43, as by twisting its end portion about a pin. The wheel 39 is pivotally mounted on a shaft 44 which is secured to the housing 20 and extends normally therefrom and in the direction of the pivot 23. The direction-selection wheel 39 is capable of rotating to and being secured at either of two positions, in a well-known manner, so as to be able to alternate the contact shoe 29 or 30 in engagement with the cam 31 and preload the spring 38 to maintain such engagement.

As in the embodiment of FIGS. 2, 3 and 4, the claw plate 22 is positively displaced from its neutral or horizontal position by the cam 31, effecting an increase in the preload of the spring 38 proportional to the displacement of said claw plate 22. When the cam 31 has rotated so as to effect the maximum displacement of the claw plate 22 from its neutral position, further rotation of the cam 31 in the same direction will allow the spring 38 to return the claw plate 22 to its neutral position at a rate dependent upon the geometry of the cam 31 as well as its rate of rotation.

Rotation of the direction-selection wheel 39 to its alternate position will change the contact shoe 29 or 30 in engagement with the cam 31. If the direction of rotation of the cam 31 is then reversed, the film 27 will reverse its direction of travel in much the same manner as indicated in the discussion of the embodiment of FIGS. 2, 3 and 4, supra.

It can readily be seen that many variations and modifications of the present invention are possible in the light of the aforementioned teachings and it will be apparent to those skilled in the art that various changes in form and arrangement of components may be made to suit requirements without departing from the spirit and scope of the invention. It is therefore to be understood that within the scope of the appended claims, the instant invention may be practiced in a manner otherwise than is specifically described herein.

What is claimed is:

1. An intermittent film advance mechanism for use in a cinematograph, including:
   a housing or the like;
   a claw plate rockably secured to said housing and having at least two fixed spaced integral therewith contact surfaces;
   a constant diameter cam rotatably secured to said housing for forward and reverse movement and in engagement with one of said contact surfaces whereby rotation of said cam will displace said claw from an initial position; and means, structurally independent from said cam and cooperable therewith, for returning said claw plate to said initial position.

2. The invention as set forth in claim 1, further including means for maintaining engagement between said cam and one of said contact surfaces.

3. The invention as set forth in claim 2, wherein said claw plate returning means comprises a spring.

4. The invention as related in claim 3, wherein said engagement maintaining means comprises a spring.

5. The invention as set forth in claim 4, wherein said cam is in engagement with not more than one of said contact surfaces for any particular direction of rotation.

6. The invention of claim 5, further including means, cooperable with said engagement maintaining means, for changing the contact surface in engagement with said cam.

7. The invention as recited in claim 6, wherein said spring is generally U shape, including a pair of legs, and said claw plate includes a pair of spaced tabs adapted to receive said legs.

8. The invention as recited in claim 7, wherein said spring legs are preloaded to maintain engagement between said cam and one of said contact surfaces when said claw plate is in its initial position.

9. The invention as set forth in claim 8, wherein said means for effecting a change in the contact surface in engagement with said cam includes an apertured plate slidably secured to said housing so as to be movable between either of two positions and secured thereat.

10. The invention as related in claim 9, wherein said spring legs extend through said apertured plate and are received thereby such that only one spring leg and tab will be in engagement for each position of said apertured plate, and movement of said apertured plate between its two positions will alternate both the spring leg and tab engaged.

11. The invention of claim 6, wherein said spring comprises a torsion spring having oppositely directed legs, and said means for changing the contact surface in engagement with said cam comprises a wheel rotatably secured to said housing and capable of moving between and maintaining either of two remote positions; one of said spring legs being secured to said claw plate and the other of said spring legs being eccentrically secured to said wheel, whereby said cam will engage a different one of said contact surfaces for each position maintained by said wheel.

12. The invention as recited in claim 10, wherein said film includes a series of aligned perforations, and said claw plate extends to a bifurcated end portion having tines adapted to be received within said perforations.

13. An intermittent film advance mechanism for use in a cinematograph, including:
a housing or the like;
a claw plate rockably secured to said housing and having at least two contact surfaces;
a constant diameter cam rotatably secured to said housing for forward and reverse movement and disposed between said contact surfaces such that a predetermined clearance exists between the cam and one of said contact surfaces when the cam is engaged with the other of said contact surfaces, whereby rotation of said cam will displace said claw from an initial position; and
means, structurally independent from said cam and cooperable therewith, for returning said claw plate to said initial position.

14. The invention of claim 13, wherein said film includes a series of aligned perforations of predetermined width and said claw plate extends to an end portion having at least one tine adapted to be received within said perforations, and of a width less than that of said perforations, whereby alternating the contact surface in engagement with said cam will cause said tine to traverse a distance equal to the difference in width between one such perforation and said tine.

15. The invention of claim 14, wherein said contact surfaces include a pair of spaced parallel contact shoes secured to said claw plate.

16. In combination with a cinematograph having a housing, and a film having a series of aligned perforations therethrough; means for intermittently and reversibly advancing said film through said cinematograph, including:
a claw having a pair of contact surfaces; and having an end portion adapted to be received within any of said perforations;
a cam disposed between said contact surfaces and rotatably secured to said housing for both clockwise and counter-clockwise rotation; said cam capable of engaging only one of said contact surfaces at a time; and
means for alternating the contact surface in engagement with said cam and maintaining such engagement so that a particular one of said contact surfaces is always in engagement with said cam dependent on its direction of rotation.

17. The invention of claim 16 wherein said claw is pivotally secured to said housing, said cam is disposed between said contact surfaces with a predetermined clearance therebetween, and the width of each of said perforations exceeds that of said tine by an amount such that alternating the contact surface in engagement with said cam will cause said tine to traverse a distance equal to said amount.

18. The invention of claim 17, wherein said claw comprises a plate having an opening therein and said contact surfaces are comprised of a pair of shoes diametrically positioned about the periphery of said opening.

19. The invention as related in claim 18, wherein rotation of said cam will cause displacement of said claw from an initial position and further including means structurally independent of said cam and cooperable therewith for returning said claw to said initial position.

20. In combination with a motion picture projector, or the like, having a housing and a film having a series of aligned perforations of uniform width; means for advancing said film through said projector, including:
a claw rockably secured to said housing and having an end portion adapted to be received within each of said perforations and having a pair of spaced aligned contact surfaces thereon;
a cam disposed between said contact surfaces and rotatably secured to said housing so as to be capable of forward and reverse movement;
means for effecting and maintaining contact between one of said contact surfaces and said cam, so that rotation of said cam in one direction will effect displacement of said claw from an initial position;
means structurally independent of said cam and cooperable therewith for returning said claw to said initial position upon continued movement of said cam in the same direction;
means for alternating the contact surface in engagement with said cam such that reversal of the direction of rotation of said cam will displace said claw from said initial position in a direction opposite to that of said first-mentioned displacement; and
means structurally independent of and cooperable with said cam for returning said claw to said initial position.

21. The invention as set forth in claim 20, further comprising:
means for maintaining engagement between said cam and a different one of said contact surfaces dependent on the direction of rotation of said cam; whereby rotation of said cam in one direction will cause said film to advance through said projector in a forward direction and reversal of said cam will cause said film to reverse its direction of advancement through said projector; and
means for preventing misregistration of said film with said projector upon the reversal of the direction of advance of said film through said projector.

* * * * *